July 28, 1964     C. M. MIKKELSON     3,142,364
AIR CIRCULATING BRAKE SHIELD
Filed Feb. 18, 1963     2 Sheets-Sheet 2
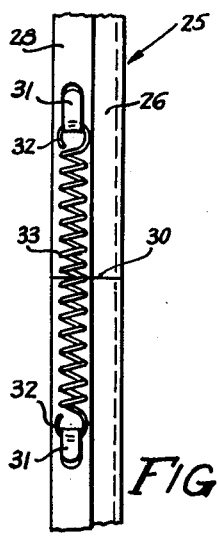
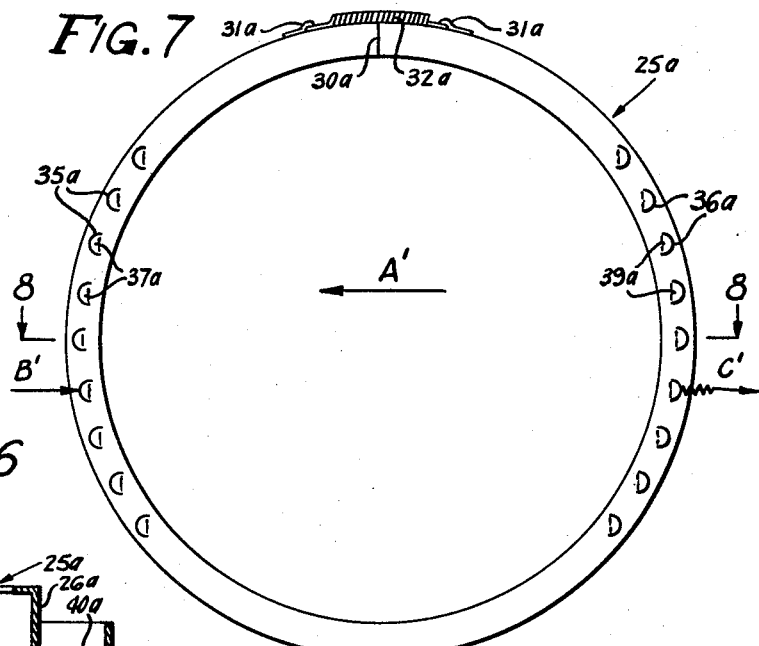
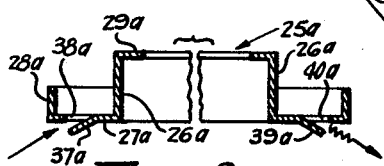
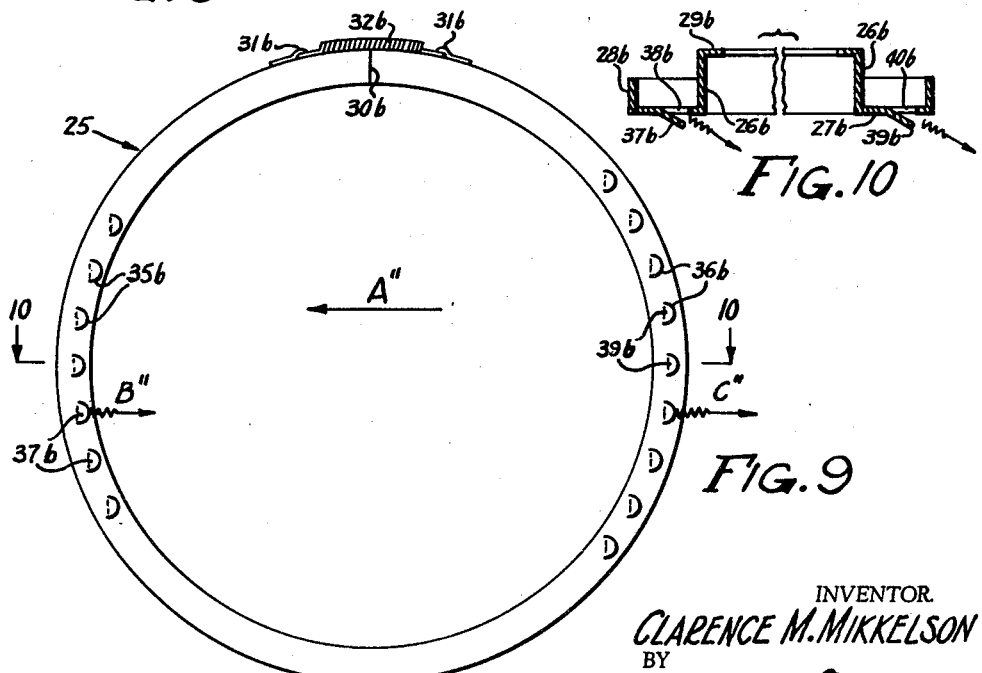
INVENTOR.
CLARENCE M. MIKKELSON
BY Kimmel & Crowell
ATTORNEYS.

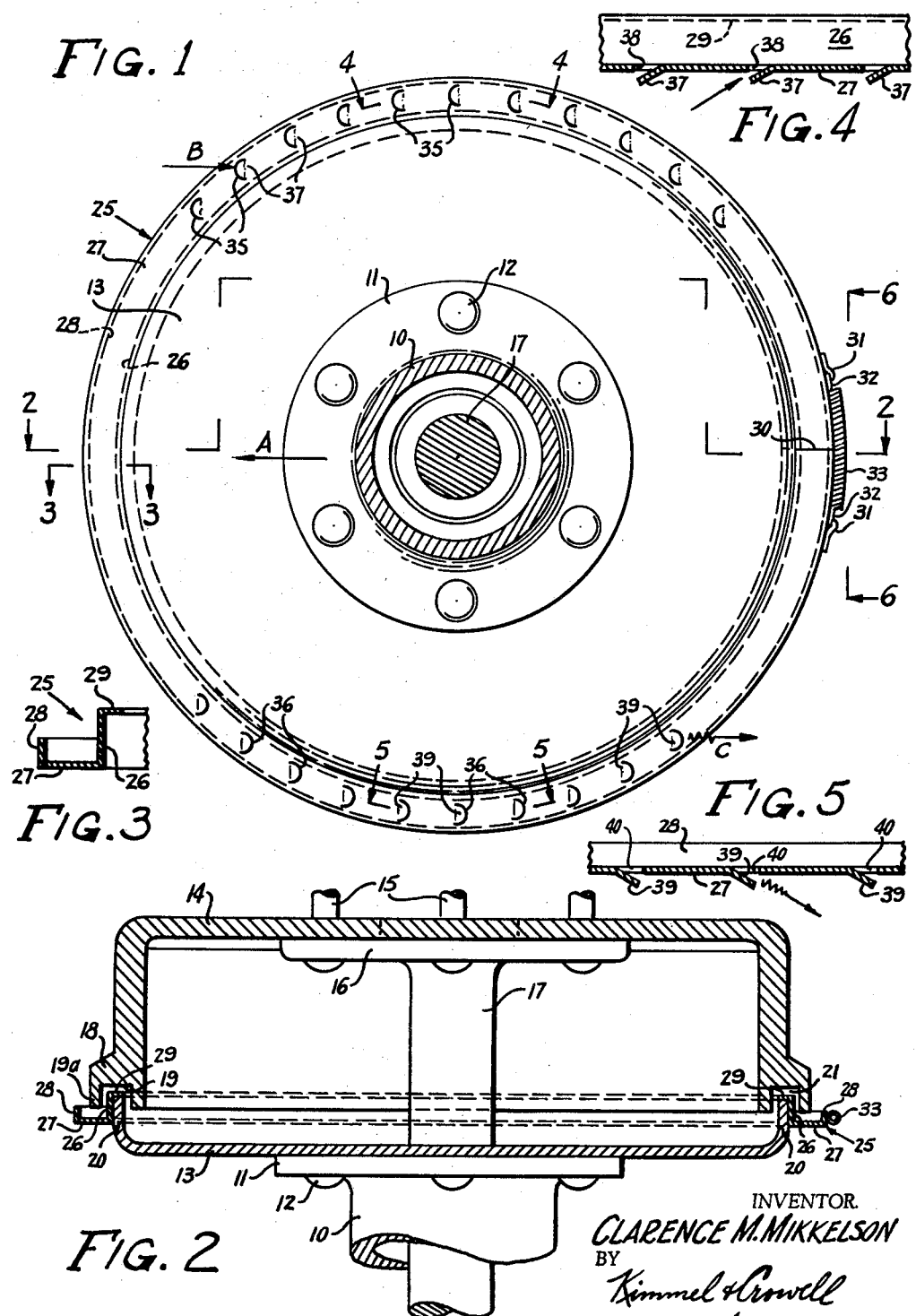

United States Patent Office 3,142,364
Patented July 28, 1964

3,142,364
AIR CIRCULATING BRAKE SHIELD
Clarence Melvin Mikkelson, Linn Court,
New Hampton, Iowa
Filed Feb. 18, 1963, Ser. No. 259,318
2 Claims. (Cl. 188—264)

This invention relates to an air circulating brake shield and has as its primary object the provision of a shield which may be positioned about the periphery of the stationary carrier plate of a motor vehicle wheel and provided with a vented flange, through the vents of which air may be circulated to the interior of the brake drum, as well as to the outside thereof.

An additional object of the invention is the provision of a shield of this character which reduces the high temperature in a brake drum which, hitherto, has been one of the primary causes of wear.

A further object is the provision of a shield which tends to reduce the introduction of foreign matter between the lining and the brake drum, another important cause of wear, by closing the opening therebetween, with the exception of the vents, and, by creating a circulation of air in this space, expels loose foreign matter such as dust, grit, and the like before it can settle and interpose itself between the brake drum and the lining.

A further object of the invention is the provision of a device of this character which may be easily and simply installed on any conventional motor vehicle.

An additional object of the invention is the provision of a device of this character which is sturdy and durable in construction, reliable and efficient in operation, and relatively simple and inexpensive to manufacture.

A more specific object of the invention resides in the particular positioning, directional location, and arrangement of the perforated louvers or openings, and the shields therefor, to facilitate the circulation of air by occasioning suction in the interior of the drum causing the air to rush in through a certain portion of the louvers, and be expelled from a certain other portion, thus not only cooling the brake drum and lining but also expelling foreign matter from the interior of the drum.

Still other objects reside in the combinations of elements, arrangements of parts, and features of construction, all as will be more fully pointed out hereinafter, and disclosed in the accompanying drawings wherein there are shown preferred embodiments of this inventive concept.

In the drawings:

FIGURE 1 is a side elevational view of a brake drum and carrier plate therefor showing one form of air circulating brake shield constructed in accordance with the instant invention applied thereto, the vehicle wheel being removed, and the axle and its housing being shown in section.

FIGURE 2 is a sectional view taken substantially along the line 2—2 of FIGURE 1 as viewed in the direction indicated by the arrows.

FIGURE 3 is an enlarged sectional view of the air circulating shield taken substantially along the line 3—3 of FIGURE 1 as viewed in the direction indicated by the arrows.

FIGURE 4 is an enlarged sectional view of the air circulating shield taken substantially along the line 4—4 of FIGURE 1 as viewed in the direction indicated by the arrows.

FIGURE 5 is an enlarged sectional view taken substantially along the line 5—5 of FIGURE 1 as viewed in the direction indicated by the arrows.

FIGURE 6 is an enlarged fragmentary detail view taken substantially along the line 6—6 of FIGURE 1 as viewed in the direction indicated by the arrows.

FIGURE 7 is a side elevational view of a modified form of shield constructed in accordance with the instant invention as shown in FIGURE 1, but disassociated from the brake drum and carrier plate.

FIGURE 8 is an enlarged sectional view taken substantially along the line 8—8 of FIGURE 7, parts thereof being broken away.

FIGURE 9 is a view similar to FIGURE 7 but showing a further modified form of construction; and FIGURE 10 is an enlarged sectional view taken substantially along the line 10—10 of FIGURE 9 as viewed in the direction indicated by the arrows, parts thereof being broken away.

Similar reference characters refer to similar parts throughout the several views of the drawing.

Having reference now to the drawings in detail, there is shown at 10 a stationary vehicle axle housing, which includes a flange 11 to which is secured by means of bolts 12 a conventional stationary carrier plate 13. A brake drum 14 is secured as by means of bolts 15 to a flange 16 on the usual rotatable axle 17 which extends through housing 10, the vehicle wheel being secured to the bolts 15 in a conventional manner. The interior of the brake drum 14 contains the usual brake lining and other elements associated with the vehicle brake (not shown).

As is conventional in such constructions the inner periphery of brake drum 14 is enlarged as at 18, and provided with an annular channel or groove 19 into which the flange 20 of carrier plate 13 extends, leaving a space 21 between the drum and the flange of the carrier plate.

The instant invention, in accordance with the embodiment illustrated in FIGURES 1 to 6, inclusive, comprises an annulus generally indicated at 25 which includes a circular U-shaped channel having a radially inner wall 26, a bight 27, and a radially outer wall 28, the outer wall being of less height than the inner wall, and the top of the inner wall being provided with a short flange extending inwardly, as indicated at 29, and lying in a plane parallel to the bight 27. The ring is split as at 30, and is adapted to be fitted closely around the flange 20 of the carrier plate 13, and held in stationary position. In this position, as best shown in FIGURE 2, the inner wall 26 closely engages the exterior of flange 20, while the bight 27 is spaced longitudinally of the axle 17 away from the outer rim 19a of the channel 19. The inner flange 29 is also spaced from the bottom of channel 19, so that an air space is provided between the rotating brake drum 14 and the carrier plate 13. The outer wall 28 extends upwardly to a point substantially flush with the tip of the periphery of flange or rim 19a.

As best shown in FIGURES 1 and 6, a pair of oppositely disposed lugs or hooks 31 are positioned on opposite sides of the split 30 and connected by hooks 32 at opposite ends of a coil spring 33 to secure the ring or band 25 closely about flange 20.

A very important element of the instant invention resides in the provision of two sets of louvers, an upper set, the individual louvers of which are designated at 35, and a lower set designated at 36.

Each of the upper louvers 35 consists of a semi-circular outwardly extending baffle 37 which is stamped to provide a corresponding inner opening 38. The upper series of baffles 35 extends about an arc of approximately 90°, with each baffle portion 37 extending along a line parallel to the vertical axis of the carrier plate, in contradistinction to radial positioning, the arrangement being such that the open portion and the maximum height of each baffle plate 37 overlies the opening 38 and is positioned rearwardly with respect thereto in diametric opposition to the direction of travel of the vehicle as indicated by the arrow A.

In contrast the lower series of baffles 36 which also extend about an arc of approximately 90° face in a rearward direction and comprise semicircular stamped out outwardly extending projecting portions 39 which overlie openings 40. The stamped out portions are also arranged along a series of lines parallel to the vertical axis of carrier plate 13, so that each of the series of baffles 36 opens directly oppositely to the openings of the series of baffles 35.

The arrangement is thus such that air enters the baffles 35, is directed by the projections 37 through the openings 38 into the interior of brake drum 14 and circulates fully therethrough, turbulence being occasioned by rotation of the brake drum 14, and then exits through the openings 40 being directed rearwardly by the baffles 39. Similarly, the travel of the vehicle creates a suction in the direction indicated by the arrow C which assists in withdrawing the circulated air through the series of baffle openings 36.

FIGURES 7 and 8 disclose a modified form of construction wherein a ring 25a is split as at 30a and secured together by means of a spring 32a engaging hooks or lugs 31a, the cross-sectional configuration of the ring 25a being substantially identical to that of the previously described modification and including a U-shaped portion having an inner wall 26a, a bight 27a, and a relatively short outer wall 28a, with a flange 29a adapted to be positioned in a manner identical to that of the previously disclosed modification. In this construction, a series of louvers 35a which include baffles 37a overlying openings 38a are positioned about an arc of approximately 90° on the forward side of the vehicle in the direction of travel as indicated by the arrow A'. A second series of louvers 36a which include semi-circular baffles 39a overlying corresponding semi-circular openings 40a, face rearwardly of the direction of travel and extend about an arc of approximately 90°. In this modification the circulation of air enters the louvers 35a in the direction indicated by the arrow B' and exits through the louvers 36a which create a suction and a turbulence in the direction indicated by the arrow C'. The theory of operation is substantially identical with that of the foregoing modification, it being noted that all of the semi-circular louvers of both the series 35a and 36a open along lines parallel to the vertical axis of the ring or band 25a.

Still another modification is disclosed in FIGURES 9 and 10 wherein a ring or band 25b is split as at 30b and closed by means of a spring 32b secured to lugs 31b. In cross section the ring 25b is substantially identical to the previously described modifications including a U-shaped member having an inner wall 26b, a bight 27b, and a relatively short outer wall 28b in a flange 29b adapted to overlie the edge of carrier plate flange 20. In this modification, however, a series of louvers 35b is identical to the previously described series 35a and extends about an arc of 90° toward the front of the vehicle, but the baffles 37b overlying the semi-circular openings 38b extend rearwardly of the direction of travel as indicated by the arrow A", so that they open in a direction opposite to the flow of air over the carrier plate. In this modification, a vacuum is created to the rear of the baffles 39b causing an intake or suction of air in the direction indicated by the arrow B", so that air is drawn inwardly into the brake drum in a direction opposite to the direction of travel of the vehicle. A similar suction is created at the rear of the series of baffles 36b which are identical to the previously described baffles 36a and face rearwardly overlying openings 40b with semi-circular lugs 39b. In each of the illustrated modifications the air is circulated completely through the drum, as well as over the outside rim thereof being directed by means of the outer wall 28, 28a, or 28b so that complete cooling is effected interiorly of the drum as well as about its exterior periphery. At the same time the circulating air inside of the drum tends to remove foreign matter such as dirt or dust, and thus reduces to a minimum the wear and tear incident to such foreign matter interiorly of the drum, as well as the excessive wear caused by undue heating.

From the foregoing it will now be seen that there is herein provided an improved air circulating brake shield which accomplishes all the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

I claim:

1. In combination with a vehicle having a rotatable axle, a brake drum carried thereby, a stationary axle housing and a carrier plate carried by said axle housing, said brake drum having an annular groove about the periphery and said plate having a flange extending into said groove but spaced from the walls thereof, an air circulating brake shield comprising a ring having a generally U-shaped cross-sectional configuration including an inner wall engaging closely about said flange on said carrier plate, a bight, a relatively short outer wall and an annular flange extending from the outer end of said inner wall inwardly overlying the edge of the flange on said carrier plate, said bight having a first series of louvers thereon comprising an air inlet and a second series of louvers thereon comprising an air outlet, wherein each louver of each series of louvers comprises an outwardly extending projection overlying an opening, each projection extending from a line parallel to the vertical axis of a carrier plate, the first series of louvers opening forwardly in a normal direction of travel of the vehicle and the second series of louvers opening rearwardly.

2. In combination with a vehicle having a rotatable axle, a brake drum carried thereby, a stationary axle housing and a carrier plate carried by said axle housing, said brake drum having an annular groove about the periphery and said plate having a flange extending into said groove but spaced from the walls thereof, an air circulating brake shield comprising a ring having a generally U-shaped cross-sectional configuration including an inner wall engaging closely about said flange on said carrier plate, a bight, a relatively short outer wall and an annular flange extending from the outer end of said inner wall inwardly overlying the edge of the flange on said carrier plate, said bight having a first series of louvers thereon comprising an air inlet and a second series of louvers thereon comprising an air outlet, wherein each louver of each series of louvers comprises an outwardly extending projection overlying an opening, each projection extending from a line parallel to the vertical axis of said carrier plate, the louvers of both series opening rearwardly in a direction opposite to the normal direction of travel of the vehicle whereby air is induced into said first series by suction.

References Cited in the file of this patent

UNITED STATES PATENTS

| | | |
|---|---|---|
| 1,737,325 | Oliver | Nov. 26, 1929 |
| 1,943,837 | Perrot | Jan. 16, 1934 |
| 2,024,243 | Nelson | Dec. 17, 1935 |
| 2,091,865 | Leveen | Aug. 31, 1937 |
| 2,106,702 | Campbell | Feb. 1, 1938 |
| 2,133,597 | Tjaarda | Oct. 18, 1938 |
| 2,181,008 | Bonzack | Nov. 21, 1939 |
| 2,265,938 | Eksergian | Dec. 9, 1941 |

FOREIGN PATENTS

| | | |
|---|---|---|
| 148,000 | Great Britain | July 26, 1920 |
| 795,548 | France | Jan. 8, 1936 |
| 519,010 | Canada | Nov. 29, 1955 |